/ United States Patent (12) Cho

(10) Patent No.: US 6,330,993 B1
(45) Date of Patent: *Dec. 18, 2001

(54) FLAT PANEL DISPLAY DEVICE HAVING A WIDE ADJUSTING RANGE OF A VISUAL ANGLE

(75) Inventor: Chang-Ho Cho, Incheon-si (KR)

(73) Assignee: Samsung Electronics Co., Ltd., Suwon (KR)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/223,761

(22) Filed: Dec. 31, 1998

(30) Foreign Application Priority Data

Dec. 31, 1997 (KR) .................................................. 97-44775

(51) Int. Cl.[7] .................................................... A47G 29/00
(52) U.S. Cl. ................... 248/371; 248/183.1; 248/183.2; 248/921
(58) Field of Search ................................. 248/183.1, 371, 248/183.2, 918, 919, 921, 922, 923, 349.1; 361/682, 681, 683, 686

(56) References Cited

U.S. PATENT DOCUMENTS

| 5,016,849 | * | 5/1991 | Wu | ..................... 248/183.1 |
| 5,566,917 | * | 10/1996 | Wu | ..................... 248/311.2 |
| 5,732,922 | * | 3/1998 | Jeon | ..................... 248/371 |
| 5,947,440 | * | 9/1999 | Cho | ..................... 248/923 |
| 5,978,211 | * | 11/1999 | Hong | ..................... 361/683 |

* cited by examiner

Primary Examiner—Leslie A. Braun
Assistant Examiner—Gwendolyn Baxter
(74) Attorney, Agent, or Firm—Staas & Halsey LLP

(57) ABSTRACT

A flat panel display device having a stand cap which is firmly assembling to a hinge member. The flat panel display device includes a display unit for displaying an image and is vertically and horizontally pivotally supported by a stand through a hinge member. The hinge member has a tilting shaft for pivoting the display unit vertically and a rotation member for rotating the display unit horizontally. The stand cap is fixed to the rotation member by a fastener so that the stand cap is rotated with and not released from the rotation member when the display unit is rotated.

20 Claims, 5 Drawing Sheets

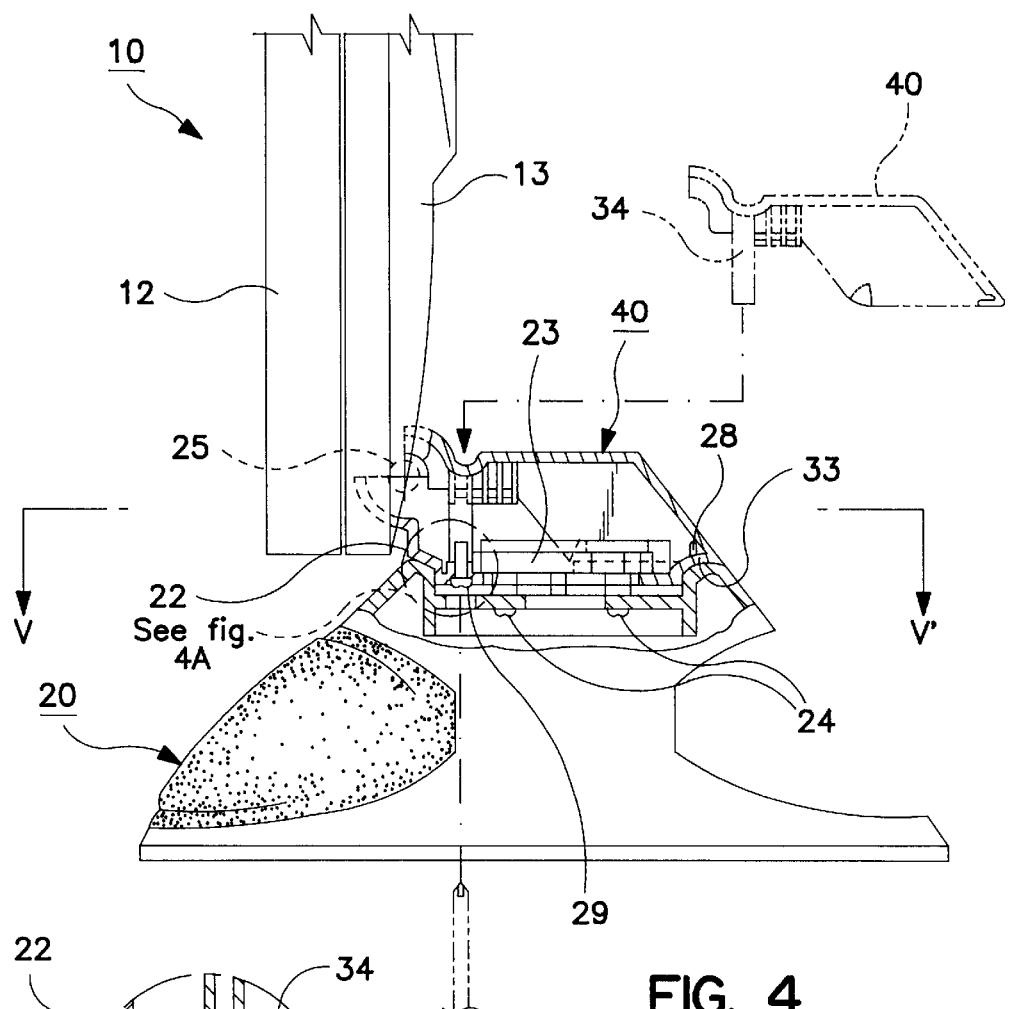
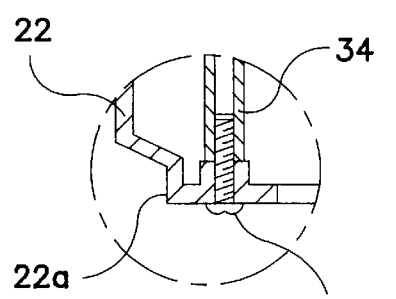
FIG. 4
FIG. 4A

FLAT PANEL DISPLAY DEVICE HAVING A WIDE ADJUSTING RANGE OF A VISUAL ANGLE

CROSS-REFERENCE TO RELATED APPLICATION

This application makes reference to, incorporates the same herein, and claims all benefits accruing under 35 U.S.C. §119 from my utility model application entitled Connection Device for Stand Cap of Flat Panel Display filed with the Korean Industrial Property Office on Dec. 31, 1997 and duly assigned Ser. No. 97-44775 by that Office.

BACKGROUND OF THE INVENTION

1. Field of the Invention

The present invention relates to a flat panel display device, and more particularly, the present invention relates to a flat panel display device having a stand cap which can be easily connected to and disconnected from the display device, and which does not become separated from the display device when the display device is rotated in a horizontal direction to adjust a visual angle of the display device.

2. Description of the Related Art

As shown in FIG. 1, generally, a conventional flat panel display device is pivotally supported by a stand to adjust a visual angle of the display device in horizontal and vertical directions. The conventional flat panel display device includes a display unit 1 that has a flat panel (not shown) to display an image, and a stand 2 that rotatably supports the display unit 1. A hinge member 3 installed at an upper portion of the stand 2 connects the display unit 1 to the stand 2. As a result, the display unit 1 is rotatably supported by the stand 2 through the hinge member 3.

The hinge member 3 includes a tilting shaft 5 which is supported by the hinge member 3 in a vertical direction. The display unit 1 is connected to the tilting shaft 5 through hinge brackets 6 which are pivotally supported at both ends of the tilting shaft 5, respectively. In this way, the display unit 1 is rotated by the hinge member 3 in a horizontal direction and pivoted by the tilting shaft 5 in a vertical direction. When rotatably mounted to the stand 3, the hinge member 3 is covered by a stand cap 4 to prevent foreign substances, such as dust, etc., from entering into the hinge member 3. The stand cap 4 also prevents an exterior of the display device from falling off due to exposure of the hinge member 3.

Snap-recesses or snap-projections (not shown) located inside the hinge member 3 are snap-fitted with snap-recesses or snap-projections (not shown) located within the stand cap 4, so that the stand cap 4 is snap-fittingly fixed to the hinge member 3. As a result, the stand cap 4 can be easily engaged with and separated from the hinge member 3.

Since the stand cap 4 is snap-fittingly fixed to the hinge member 3 as described above, the stand cap 4 remains in a stationary state when the display unit 1 is pivoted in a vertical direction, but is rotated along with the hinge member 3 when the display unit 1 is rotated in a horizontal direction.

In the conventional flat panel display device, however, when the stand cap 4 is rotated horizontally with the hinge member 3, the snap-fitting between the hinge member 3 and the stand cap 4 eventually is released, so that the stand cap 4 becomes separated from the hinge member 3. When the hinge member 3 and the stand cap 4 become separated, foreign substances such as dust, etc., enter into the hinge member 3, corrupting the functional capabilities of the hinge member 3 and the display unit 1.

SUMMARY OF THE INVENTION

Accordingly, it is an object of the present invention to provide a flat panel display device having a stand cap which can be easily connected to and disconnected from the display device, and is prevented from being separated from the display device when the display device is rotated in a horizontal direction to adjust a visual angle of the display device.

The above and other objects of the present invention are achieved by providing a flat panel display device that includes a display unit to display an image, and a stand that has a circular recess, to support the display unit. The flat panel display device also includes a hinge member that has a ring-shaped rotation member rotatably fixed to the circular recess of the stand, and a holder, fixed to the circular recess of the stand, to secure the rotation member in the stand. A bracket case is fixed to the rotation member and the display unit, and a fastener fixes a stand cap to the hinge member to cover the hinge member.

The stand cap has a boss that extends toward the hinge member and is connected to the hinge member by the fastener.

The above and other objects of the present invention are also achieved by providing a flat panel display device that includes a display unit to display an image, and a stand, that has a circular recess, to support the display unit. The flat panel display device also includes a hinge member that has a ring shaped rotation member that is rotatably fixed to the circular recess of the stand, and a holder fixed to the circular recess of the stand to fix the rotation member in the stand. A bracket case is fixed to the rotation member and the display unit, and a stand cap is fixed to the hinge member by a fastener to cover the hinge member. The stand cap has a boss which extends toward the hinge member and is connected to the hinge member by the fastener.

The boss has an end face that makes contact with the rotation member when the stand cap is fixed to the hinge member. The preferred embodiment of the present invention may also include a projection formed at a rear portion of the rotation member and a locking member located on the stand cap that locks to the projection. In addition, a plurality of grooves may be formed at inner sides of the bracket case in which a plurality of ribs located on the stand cap are respectively inserted, with the grooves and the ribs extending vertically and parallel to each other. Furthermore, a pair of convex portions may be included at an inner circumference of the rotation member, and a pair of hooks located on the stand cap are hooked to respective ones of the convex portions.

The above and other objects of the present invention are still further achieved by providing a flat panel display device that includes a stand that has a circular recess to support a display unit, and a hinge member, having a ring-shaped rotation member rotatably fixed to the circular recess of the stand. A stand cap is fixed to the rotation member to cover the hinge member, to rotate with the rotation member, and is prevented from being separated from the hinge member as the display unit is rotated.

BRIEF DESCRIPTION OF THE DRAWINGS

These and other objects and advantages of the invention will become apparent and more readily appreciated from the following description of the preferred embodiments, taken in conjunction with the accompanying drawings, of which:

FIG. 4 is a partial cross-sectional view of the stand, the hinge member, and the stand cap according to the preferred embodiment of the present invention.

DETAILED DESCRIPTION OF PREFERRED EMBODIMENT

Figure 1:
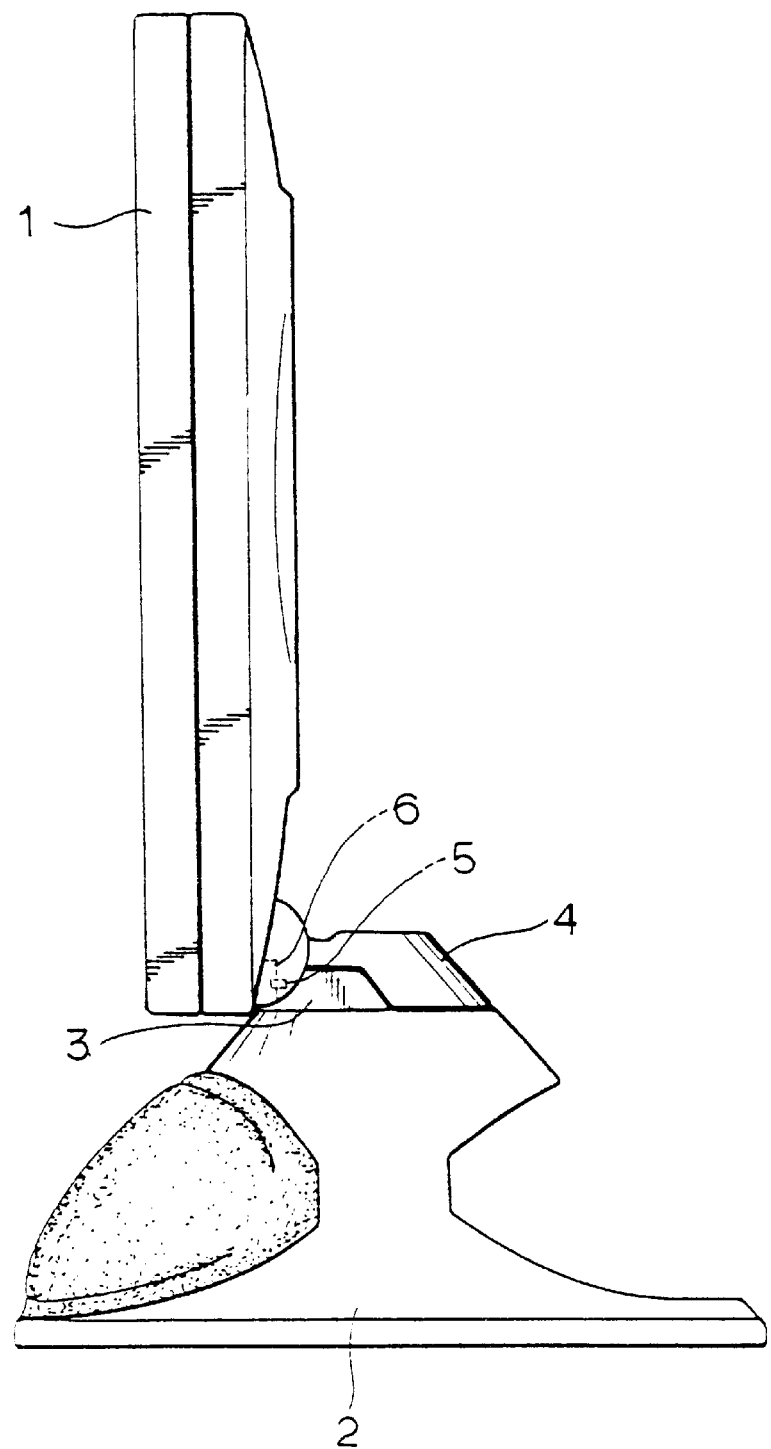
FIG. 1 is a side view of a flat panel display device according to the conventional art.

Reference will now be made in detail to the present preferred embodiment of the present invention, examples of which are illustrated in the accompanying drawings, wherein like reference numerals refer to the like elements throughout. The embodiment is described below in order to explain the present invention by referring to the figures.

Figure 2:
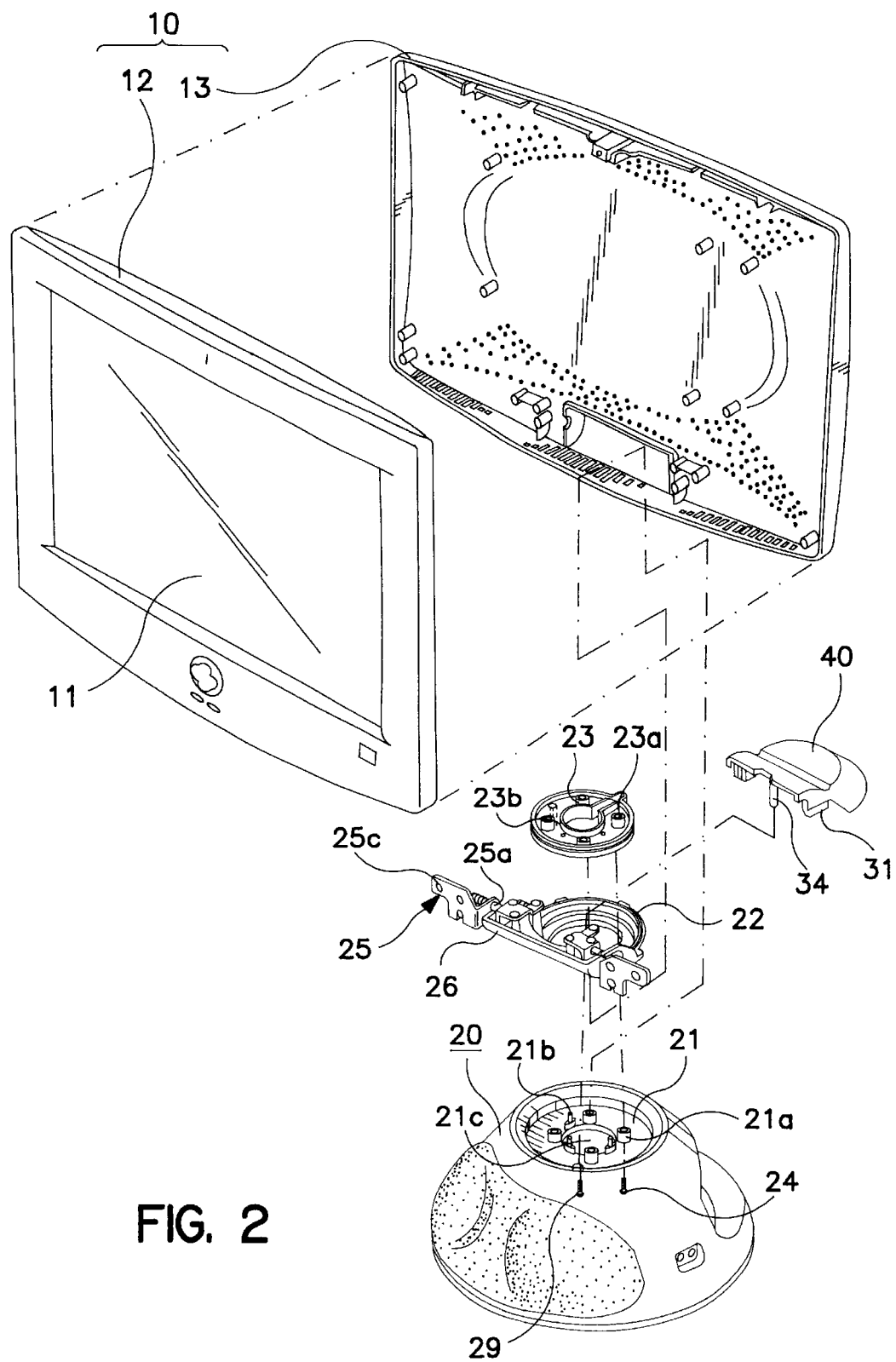
FIG. 2 is an exploded perspective view of a flat panel display device according to a preferred embodiment of the present invention.

As illustrated in FIG. 2, a flat panel display device according to a preferred embodiment of the present invention includes a display unit 10 to display an image, and a stand 20 to support the display unit 10. A hinge member 30 is secured to the display unit 10 and is rotatably mounted to the stand 20 to adjust a visual angle of the display unit 10. A stand cap 40 is fixed to the hinge member 30 by a fastener 29, such as a bolt for example. The stand cap 40 covers the hinge member 30 so that the hinge member 30 is not exposed. As a result, the stand cap 40 prevents foreign substances, such as dust, etc., from entering into the hinge member 30.

The display unit 10 includes a front case 12, a rear case 13, and a flat panel 11 disposed between the front case 12 and the rear case 13 to display the image. The stand 20 supports the display unit 10 and a circular recess 21 is formed at a top portion of the stand 20. An opening 21c is formed at a center of the circular recess 21 and a plurality of cylindrical bodies 21a are arranged in the circular recess 21 at regular intervals around the opening 21c. The stand 20 also includes two or more pins 21b, with each of the pins 21b being positioned between the cylindrical bodies 21a.

Figures 3, 3A:
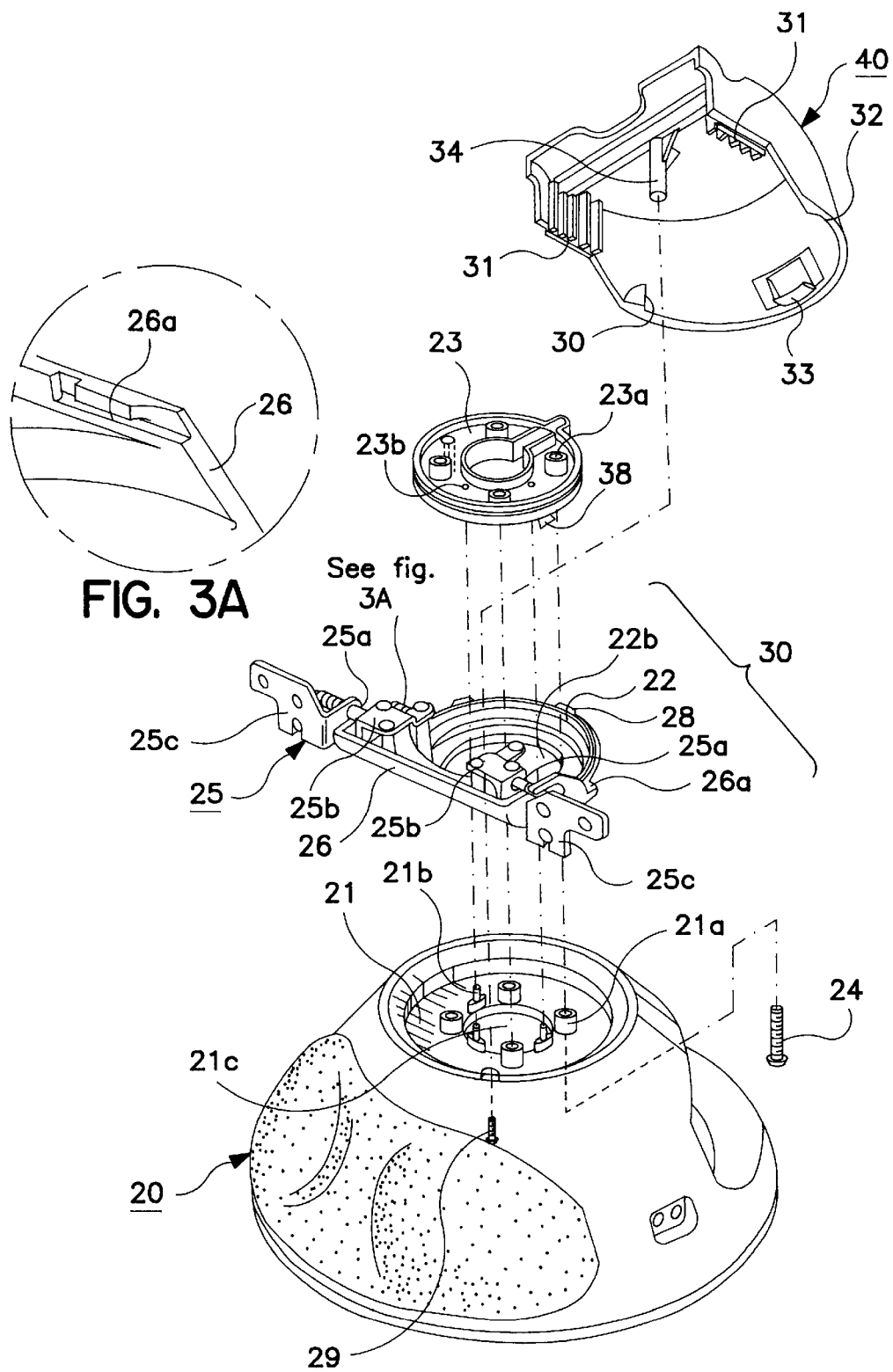
FIG. 3 is an exploded perspective view of a stand, a hinge member, and a stand cap according to the flat panel display device of the present invention.

The hinge member 30 includes a ring-shaped rotation member 22 that is rotatably mounted to the circular recess 21 of the stand 20. A holder 23 is secured to the circular recess 21 of the stand 20 to hold the rotation member 22 within the stand 20. A bracket case 26 has a hinge bracket assembly 25 which is secured to the display unit 10 by fasteners, such as screws for example. As illustrated in FIG. 3, and particularly blown up view shown in FIG. 3A, a plurality of grooves 26a are formed along inner sides of the bracket case 26. The grooves 26a extend vertically and are parallel to each other.

Figure 5:
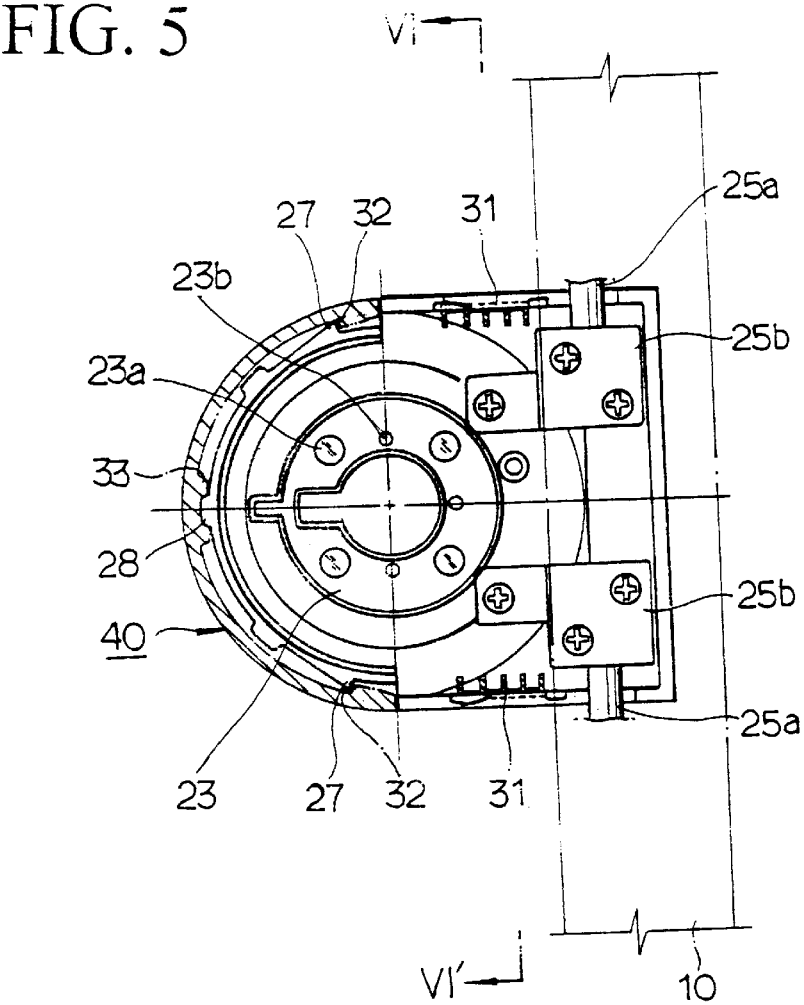
FIG. 5 is an enlarged cross-sectional view of the flat panel display device according to the preferred embodiment of the present invention, taken along section lines V–V' of FIG. 4.

As illustrated in FIG. 3, the rotation member 22 is rotatably mounted to the circular recess 21 of the stand 20, and is connected to the bracket case 26 through a pair of connecting pieces 25b. As illustrated in FIGS. 3 and 4, the fastener 29 passes through a hole 22a located along the rotation member 22, and a projection 28 is formed along a rear side of the rotation member 22. As illustrated in FIG. 5, a pair of convex portions 27 are located along an inner circumference of the rotation member 22.

As illustrated in FIGS. 3–5, the hinge bracket assembly 25 includes a pair of bracket pieces 25c that are pivotally positioned at respective one of ends of each tilting shafts 25a. The tilting shafts 25a extend transversely within the bracket case 26 in opposite directions about one axis, and are fixed, respectively, to the bracket case 26 by the pair of connecting pieces 25b. Since the bracket pieces 25c are pivotally supported by the respective one ends of the tilting shafts 25a, the display unit 10, which is connected to the bracket pieces 25c of the hinge bracket assembly 25, can be rotated about the tilting shafts 25a.

The holder 23 includes a plurality of bosses 23a, a plurality of holes 23b, and a pair of claws 38 (only one is shown) located at a lower surface of the holder 23. The pair of claws 38 are parallel to each other, extend downward toward the rotation member 22, and pass through an opening 22b of the rotation member 22. The bosses 23a are positioned above the cylindrical bodies 21a that are arranged at regular intervals in the circular recess 21, and each of the pins 21b located about the circular recess 21 are inserted into respective holes 23b of the holder 23 when the holder 23 is assembled to the circular recess 21. Thereafter, fasteners 24, such as bolts, for example, are fastened to the bosses 23a through the cylindrical bodies 21a. The claws 38 are hooked under and come in contact with a lower portion of the rotation member 22 to prevent the holder 23 from being separated from the rotation member 22 when an upward force is extended on the holder 23.

Figure 6:
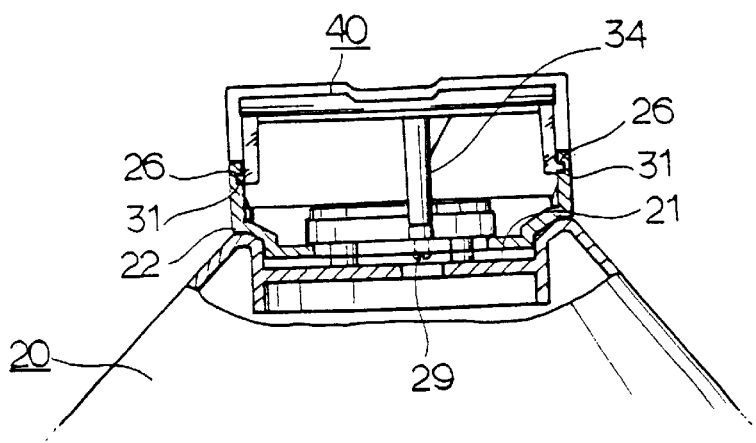
FIG. 6 is an enlarged cross-sectional view of the flat panel display device according to the preferred embodiment of the present invention, taken along the line VI–VI' of FIG. 5.

As illustrated in FIGS. 3, 4, and 6, when the hinge member 30 is mounted to the stand 20, the display unit 10 is pivotally supported vertically and horizontally by the stand 20, and the stand cap 40 is assembled to the hinge member 30 to prevent foreign substances such as dust, etc., from entering into the hinge member 30. In addition, the stand cap 40 covers and prevents the hinge member 30 from outside exposure. The stand cap 40 is preferably made of a plastic material, and includes a boss 34 with an end face that extends downward, toward the hinge member 30. As illustrated in FIG. 6, the boss 34 is connected to the hinge member 30 by the fastener 29. The boss 34 preferably has a length that enables the end face of the boss 34 to be in direct contact with an upper surface of the lower portion of the rotation member 22, so that the stand cap 40 firmly engages the hinge member 30 when the stand cap 40 is fixed to the hinge member 30.

The stand cap 40 is rotated with the rotation member 22 during rotation of the display unit 20 when adjusting a visual angle of the display unit 20. Accordingly, the stand cap 40 is prevented from being separated from the hinge member 30 due to the direct contact of the boss 34 of the stand cap 40 with the hinge member 30 during rotation of the display unit 10.

In addition, as illustrated in FIGS. 3–5, the preferred embodiment of the present invention may also include a locking member 33 that is formed along a rear side of the stand cap 40 to enable the fastener 29 to be more easily fastened to the boss 34 of the stand cap 40 when the stand cap 40 is assembled to the hinge member 30. That is, the locking member 33 is locked to the projection 28 prior to the fastener 29 being fastened to the boss 34, so that the boss 34 can be more precisely positioned above the holes 22a located in the rotation member 22, through which the fastener 29 passes when being fastened to the boss 34 (such as shown in FIG. 4A).

In addition, the stand cap 40 also includes a plurality of parallel, vertically extending ribs 31. The ribs 31 are engaged with the grooves 26a formed along the inner sides of the bracket case 26, respectively, when the stand cap 40 is assembled to the hinge member 30. Since the ribs 31 are engaged with the grooves 26a, the stand cap 40 is prevented from moving back and forth when the stand cap 40 is assembled to the hinge member 30 or when the display unit 10 is rotated.

The stand cap 40 also includes a pair of hooks 32 formed at the inner portion of the stand cap 40 that come in contact with respective convex portions 27 of the rotation member 22. Since the hooks 32 are in contact with the convex portions 27 of the rotation member 22, the stand cap 40 can be maintained in position when the fastener 29 is fastened to the boss 34 during assembly of the stand cap 40 to the hinge member 30, i.e., the rotation member 22. As a result, the fastener 29 can be more easily fastened to the boss 34.

As described above, in the flat panel display device according to the preferred embodiment of the present invention, the stand cap 40 is prevented from being separated from the hinge member 30 when the display unit 10 is rotated, since the stand cap 40 is firmly assembled to the rotation member 22 by the fastener 29.

Furthermore, in the flat panel display device according to the present invention, the stand cap 40 can be more easily assembled to the hinge member 30 since various means are provided to keep the stand cap 40 in place before the stand cap 40 is assembled to the hinge member 30 by the fastener 29.

Accordingly, the flat panel display device according to the present invention is prevented from being separated from the hinge member and prevents foreign substances, such as dust, etc., from entering into the hinge member.

Although a preferred embodiment of the present invention has been shown and described, it will be appreciated by those skilled in the art that changes may be made in the embodiment without departing from the principles and spirit of the invention, the scope of which is defined in the claims and their equivalents.

What is claimed is:

1. A flat panel display device comprising:
    a display unit to display an image;
    a stand having a circular recess, to support said display unit;
    a hinge member including a ring-shaped rotation member rotatably fixed to the circular recess of said stand;
    a holder fixed to the circular recess of said stand, to secure the rotation member in said stand;
    a bracket case fixed to the rotation member and said display unit;
    a stand cap to cover said hinge member; and
    a fastener to fix said stand cap to said hinge member.

2. The flat panel display device as claimed in claim 1, wherein said stand cap includes a boss that extends downward toward said hinge member and is connected to said hinge member by said fastener.

3. The flat panel display device as claimed in claim 2, wherein the boss has an end face that makes contact with the rotation member when said stand cap is fixed to said hinge member.

4. The flat panel display device as claimed in claim 1, wherein:
    said rotation member has a projection formed at a rear portion thereof; and
    said stand cap has a locking member that locks to said projection.

5. The flat panel display device as claimed in claim 1, wherein:
    said bracket case has a plurality of grooves formed at inner sides thereof; and
    said stand cap has a plurality of ribs inserted into the grooves of said bracket case, respectively.

6. The flat panel display device as claimed in claim 5, wherein the grooves and the ribs extend vertically and are parallel to each other.

7. The flat panel display device as claimed in claim 1, wherein the rotation member has a pair of convex portions provided at an inner circumference thereof, and said stand cap has a pair of hooks hooked to the convex portions, respectively.

8. A flat panel display device comprising:
    a display unit to display an image;
    a stand, having a circular recess, to support said display unit;
    a hinge member, including a ring shaped rotation member rotatably fixed to the circular recess of said stand;
    a holder fixed to the circular recess of said stand to fix the rotation member in said stand;
    a bracket case fixed to the rotation member and said display unit;
    a fastener; and
    a stand cap fixed to said hinge member by said fastener to cover said hinge member, having a boss which extends toward said hinge member and is connected to said hinge member by said fastener.

9. The flat panel display device as claimed in claim 8, wherein the boss has an end face that makes contact with the rotation member when said stand cap is fixed to said hinge member.

10. The flat panel display device as claimed in claim 8, wherein:
    said rotation member has a projection formed at a rear portion thereof; and
    said stand cap has a locking member that locks to said projection.

11. The flat panel display device as claimed in claim 8, wherein:
    said bracket case has a plurality of grooves formed at inner sides thereof; and
    said stand cap has a plurality of ribs inserted into the grooves of said bracket case, respectively.

12. The flat panel display device as claimed in claim 11, wherein the grooves and the ribs extend vertically and are parallel to each other.

13. The flat panel display device as claimed in claim 8, wherein the rotation member has a pair of convex portions provided at an inner circumference thereof, and said stand cap has a pair of hooks hooked to respective convex portions.

14. A flat panel display device, comprising:
    a display unit to display an image;
    a stand, having a circular recess, to support said display unit;
    a hinge member, having a ring-shaped rotation member rotatably fixed to the circular recess of said stand; and
    a stand cap fixed to the rotation member to cover said hinge member, wherein said stand cap is rotated with the rotation member and is prevented from being separated from said hinge member as said display unit is rotated.

15. The flat panel display device as claimed in claim 14, further comprising:
   a fastener to fix said stand cap to said hinge member; and
   a boss having an end face, extending downward from said stand cap toward said hinge member, and fixed to the rotation member by said fastener, wherein the rotation member has an opening with an upper surface, and the end face of said boss makes contact with the upper surface of the opening of the rotation member.

16. The flat panel display device as claimed in claim 15, further comprising:
   a projection extending from said hinge member; and
   a locking member positioned on said stand cap, wherein said fastener is a bolt and said locking member is fixed to said projection prior to said stand cap being fixed to said hinge member by said fastener.

17. The flat panel display device as claimed in claim 16, wherein said hinge member further comprises a bracket case having grooves formed along inner sides of said bracket case, and said stand cap has a plurality of parallel, vertically extending ribs inserted within the grooves.

18. The flat panel display device as claimed in claim 17, wherein the rotation member has a pair of convex portions located at an inner portion thereof, and said stand cap has a pair of hooks respectively hooked to the convex portions of the rotation member.

19. The flat panel display device as claimed in claim 14, further comprising a pair of tilting shafts fixed to said hinge member, and wherein said hinge member includes a hinge bracket assembly fixed to said display unit and pivots about the tilting shafts.

20. The flat panel display device as claimed in claim 19, wherein the hinge bracket assembly includes:
   bracket pieces pivotally positioned at a respective one of ends of each of the tilting shafts; and
   a pair of connecting pieces to respectively fix the tilting shafts to the hinge member.

* * * * *